UNITED STATES PATENT OFFICE.

HENRY DREYFUS, OF BASEL, SWITZERLAND.

MANUFACTURE OF ACETIC ACID FROM ACETALDEHYDE.

1,308,173. Specification of Letters Patent. Patented July 1, 1919.

No Drawing. Application filed January 19, 1918. Serial No. 212,594.

*To all whom it may concern:*

Be it known that I, HENRY DREYFUS, of Basel, Switzerland, have invented certain new and useful Improvements in the Manufacture of Acetic Acid from Acetaldehyde, of which the following is a specification.

Various processes have been proposed for manufacturing acetic acid by oxidation of acetaldehyde with oxygen or air.

The present invention has reference to an improved process for this purpose.

According to my present invention, liquid acetaldehyde is oxidized to form acetic acid by introducing oxygen, air or other gas containing free oxygen at substantially atmospheric pressure, into the liquid acetaldehyde maintained at a temperature of between about 0° C., and about 10° C., while thoroughly agitating the liquid acetaldehyde for insuring thorough subdivision and intimate contact between the entering gas and the liquid acetaldehyde, the reaction being carried out either without contact substances, or in the presence of ferric oxid, ferric acetate, or mixtures of ferric oxid and ferric acetate as contact substances.

If the temperature is reduced below 0° C., the formation and accumulation of peracid takes place which is very dangerous by reason of the liability of explosion, owing to spontaneous rise of temperature occurring, which cannot be controlled.

As before mentioned, the reaction of the present invention can be effected very satisfactorily without any contact materials. I may, however, employ ferric oxid, or ferric acetate, or mixtures of both, as contact material, to increase the speed and intensity of the reaction.

By means of the present invention it is possible to produce acetic acid in a simple and efficient manner with a very high yield relatively to the acetaldehyde employed. With good working the conversion of acetaldehyde into acetic acid can be practically theoretical so that only about the theoretical quantity of oxygen needs to be introduced.

In carrying out the invention with oxygen for example, this may be led into the liquid acetaldehyde (pure and undiluted) in a reaction vessel or chamber while maintaining the acetaldehyde at a temperature between 0° and 10° C., and keeping the acetaldehyde in strong agitation, for example by a rotary agitator revolving at a high speed, such as 500 to 1000 revolutions or more per minute, so as to subdivide or atomize the entering gas in contact with the liquid. A condenser should be provided at the outlet from the reaction vessel, to arrest acetaldehyde that may be carried away with the escaping gases. The oxygen is absorbed approximately quantitatively, even if introduced relatively rapidly. When about the theoretical quantity of oxygen is introduced, the glacial acetic acid formed congeals at the low temperature employed, and the oxygen ceases to be absorbed. The absorption of the oxygen in the operation can be seen by connecting to the gas outlet from the condenser a pipe depending into liquid so as to form a liquid column gage. On reducing the speed of the agitator, it will be seen from the descent of the liquid column in the pipe, and escape of oxygen, that the oxygen is absorbed less and less, in proportion to the decrease of speed, until there is practically no absorption, and at last at a certain point, although there may be a fair agitation of the liquid acetaldehyde, practically none of the oxygen passed in will combine with the acetaldehyde. It is, therefore, essential to maintain a very strong agitation to insure that the liquid acetaldehyde shall be brought into thorough and intimate contact with the oxygen.

Instead of oxygen, air may be employed, but in this case care must be taken to employ a more powerful condensing apparatus at the outlet from the reaction apparatus, to cause the aldehyde partially entrained by the air to fall back into the reaction apparatus. With this precaution it will be found that beyond the condensing apparatus only nitrogen issues, with or without traces of oxygen and acetaldehyde, as can be shown by testing or analysis of the issuing gas.

The temperature to be maintained for the reaction is between about 0° and 10° C. As considerable heat is liberated in the reaction it is necessary to cool in a suitable way, for example with water or saline solutions, to maintain this low temperature.

The manner in which the invention may be carried into effect is illustrated by the following example, it being understood that this is given by way of illustration only and is in no way restrictive.

Example 1: Into 20 kilograms of acetaldehyde contained in an apparatus, preferably of cylindrical form, provided with an agitator, capable of a speed of about 1000 revolutions per minute and of completely atomizing the bubbles of gas introduced, which apparatus is fitted with a reflux condenser for the aldehyde, there are introduced, while agitating, 5 cubic meters of oxygen. The absorption takes place in a period of about 15 to 25 hours. Care is taken, by cooling to keep the temperature always between about 0° and 10° C. When all the oxygen is introduced the liquid congeals and forms acetic acid of 100% strength.

Instead of oxygen, one can employ air, but in this case care must be taken, as before mentioned, to have a more powerful reflux condenser, in order to retain all the aldehyde. Afterward the cock leading to the reflux condenser is closed and a cock leading to a descending condenser is opened and the acid formed is distilled off. The yield varies between 90 and 100%.

The reaction can be accelerated by the employment of ferric oxid ($Fe_2O_3$) or ferric acetate (normal or basic), or mixtures thereof.

The procedure when employing said contact agents, may be explained by the following example, which is given solely by way of illustration:

Example 2: 1 kilogram of ferric oxid and 1 kilogram of ferric acetate (normal or basic) are mixed with 20 kilograms of acetaldehyde, and the same quantity of oxygen or air in Example 1 is introduced, observing the same conditions of working, as in Example 1.

The yield is approximately theoretical and the reaction is finished in about 10 to 15 hours.

The ferric acetate may be omitted and the ferric oxid may be employed alone, or conversely.

If the process is performed in accordance with the indications above given, and in particular in accordance with the examples described, the danger of explosion, due either to the formation of peracids, or other causes, is completely obviated.

What I claim and desire to secure by Letters Patent is:

1. A process of making acetic acid from acetaldehyde, which comprises passing a gas containing free oxygen at substantially atmospheric pressure through liquid acetaldehyde maintained at a temperature between about 0° C., and about 10° C., while insuring thorough subdivision of the entering gas and intimate contact thereof with the liquid acetaldehyde by strong agitation, substantially as described.

2. A process of making acetic acid from acetaldehyde, which comprises passing a gas containing free oxygen at substantially atmospheric pressure through liquid acetaldehyde in the presence of ferric oxid as a catalyzer, while maintaining the liquid at a temperature between about 0° C., and about 10° C., and in strong agitation, substantially as described.

3. A process of making acetic acid from acetaldehyde, which comprises passing a gas containing free oxygen at about atmospheric pressure through liquid acetaldehyde, in the presence of ferric oxid and ferric acetate as catalyzers, while maintaining the liquid at a temperature between about 0° C., and about 10° C., and subjecting the liquid and entering gas to powerful agitation to maintain a thorough mixture, substantially as described.

4. A process of making acetic acid from acetaldehyde, which comprises passing air at substantially atmospheric pressure through liquid acetaldehyde maintained at a temperature between about 0° C. and about 10° C., while insuring thorough subdivision of the entering air and intimate contact thereof with the liquid acetaldehyde, by powerful agitation, substantially as described.

5. A process of making acetic acid from acetaldehyde, which comprises introducing air into liquid acetaldehyde containing a ferric compound adapted to act as an oxygen-transferring catalyst, subdividing the air so introduced into the form of minute particles distributed through the body of liquid, by powerful agitation, maintaining the temperature of the liquid between the approximate limits of 0° C., and 10° C., substantially as described.

In testimony whereof I have hereunto subscribed my name.

HENRY DREYFUS.